(No Model.)

A. L. FILLMORE.
CYLINDER LUBRICATOR.

No. 400,653. Patented Apr. 2, 1889.

Witnesses
K. Smith
G. W. Paver

Inventor
Adan L. Fillmore,
per Wm. Hubbell Fisher
Attorney

UNITED STATES PATENT OFFICE.

ADAN L. FILLMORE, OF CINCINNATI, OHIO.

CYLINDER-LUBRICATOR.

SPECIFICATION forming part of Letters Patent No. 400,653, dated April 2, 1889.

Application filed May 22, 1888. Serial No. 274,747. (No model.)

*To all whom it may concern:*

Be it known that I, ADAN L. FILLMORE, a citizen of the United States, and a resident of the city of Cincinnati, in the county of Hamilton and State of Ohio, have invented certain new and useful Improvements in Cylinder-Lubricators, of which the following is a specification.

The several features of my invention and the advantages arising from their use conjointly or otherwise will be apparent from the following description.

Figure 1:
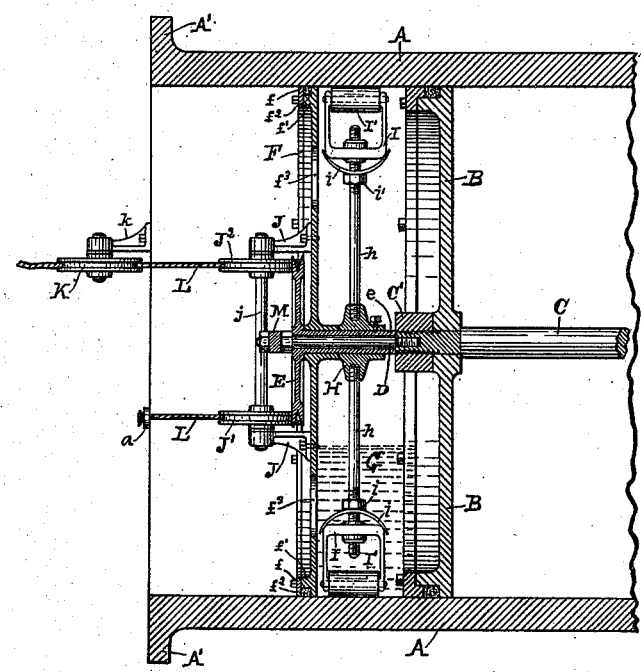
Figure 2:
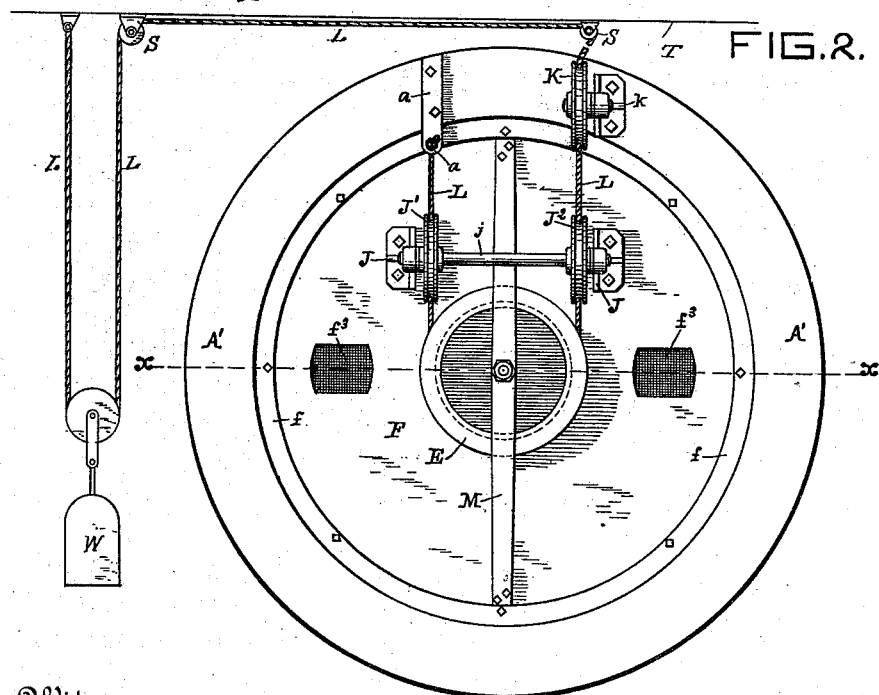

In the accompanying drawings, forming part of this specification, Figure 1 is a central section of one end of a cylinder, showing my device in connection with the piston. Fig. 2 is an end elevation of the same, viewed from that end which is at the left-hand side in Fig. 1.

The device is intended for use more particularly with the long horizontal water-cylinders commonly employed with hydraulic elevators.

A represents the cylinder, B the regular piston, and C the piston-rod operated by the same. The stem D is screwed into the piston-rod C. The pulley E, preferably provided with a V-groove and having a sleeve-hub, e, is centered on the stem D. The end of the sleeve e rests against the nut C', and in this way holds the pulley in place. The diaphragm or auxiliary piston F is centered on the sleeve e. It is provided at its outer edge with a suitable packing device, preferably such as shown—that is, a ring, f, resting on a flange, f', forming a space, $f^2$, to be filled with compressible packing material.

The space between the pistons B and F is designated by the letter G. Within the space G, rigidly attached to the sleeve e, is a hub, H, provided with a series of spokes, h, which project outward toward the face of the cylinder. Over the end of each spoke is slipped a yoke, I, carrying a roller, I', and adapted to slide on the spoke. The rollers I' are held against the face of the cylinder by the springs i, which obtain a bearing from the nuts i' on the spokes and press directly against the yokes I. The standards J, attached to the piston F, carry the shaft j, on which the grooved pulleys J' J² are loosely mounted and placed in such position that the cord passing in their grooves can pass directly into the groove of the pulley E.

On the cylinder-flange A' a grooved pulley, K, is supported by a suitable standard, k. It is placed in line with the pulley J². The cord L is attached to a bracket or stop, a, on the flange A', (or other suitable stationary object,) in line with pulley J'; then passes over the pulley J'; thence around the pulleys E and J²; then out through the cylinder, over the pulley K, and then over a pulley or pulleys, S, attached to the ceiling T or other equivalent suitable support. To the end of this cord is attached a weight, W. The space G is partially filled with grease or other lubricant, which is introduced through the hand-holes $f^3$ in the diaphragm F. The diaphragm F is preferably provided with a truss-brace, M, attached to the stem D. The strain of the diaphragm is thereby transferred to the stem D, and the sleeve e is relieved of strain, and the friction between the sleeve and the diaphragm is thereby lessened.

The mode of operation of the device is as follows: When the piston recedes from the open end of the cylinder A', the cord L is drawn into the cylinder, and as it passes over the V-pulley E imparts a rotary motion thereto, which motion is transmitted to the spokes h. In this way the rollers I' are made to continually wipe the face of the cylinder, and, moving as they do in a mass of lubricant, secure an effectual lubrication of the surface. In the opposite movement of the piston the cord L is drawn out by the weight W, thus moving the rollers in the opposite direction. By these means the surface of the cylinder is kept constantly and thoroughly lubricated.

The use of the diaphragm F is particularly advantageous, as it serves to keep the lubricant moving through the cylinder and not left at one end, as occurs when the diaphragm is omitted and the lubricant thrown directly into the cylinder.

While the various features of my invention are preferably employed together, one or more of them may be used without the remainder, and in so far as applicable one or more of said features may be used in connection with cylinders or lubricating devices other than those herein specifically described.

What I claim as new, and desire to secure by Letters Patent, is—

1. The combination of the cylinder and the piston B, a diaphragm, F, traveling backward and forward in said cylinder, and a rotating lubricant-distributer located in the space between the said piston and said diaphragm, substantially as and for the purposes specified.

2. The combination of a cylinder, a piston-head, a diaphragm fixed to the piston-rod and traveling therewith and forming a space therewith, and a rotating distributer within the said space, and means for operating the said distributer, substantially as and for the purposes specified.

3. The combination of the cylinder A, the piston B, the stem D, diaphragm F, hub H, sleeve e, spokes h, lubricators attached to the ends of the spokes h, and means for rotating the hub H, substantially as and for the purposes specified.

4. The combination of the cylinder A, the piston B, diaphragm F, the stem D, grooved pulley E, provided with sleeve e, hub H, lubricators attached to hub H, pulleys J' J², suitably supported, pulley K, and cord L, substantially as and for the purposes specified.

5. The combination of the cylinder A, piston B, stem D, diaphragm F, hub H, spokes h, yokes I, rollers I', springs i and nuts i', and means for rotating the hub H, substantially as and for the purposes specified.

ADAN L. FILLMORE.

Attest:
A. L. HERSLINGER,
WM. E. JONES.